No. 826,015. PATENTED JULY 17, 1906.
A. ST. V. BURNABY.
ELECTRICALLY PROPELLED VEHICLE AND PERMANENT WAY THEREFOR.
APPLICATION FILED OCT. 16, 1905.
4 SHEETS—SHEET 1.
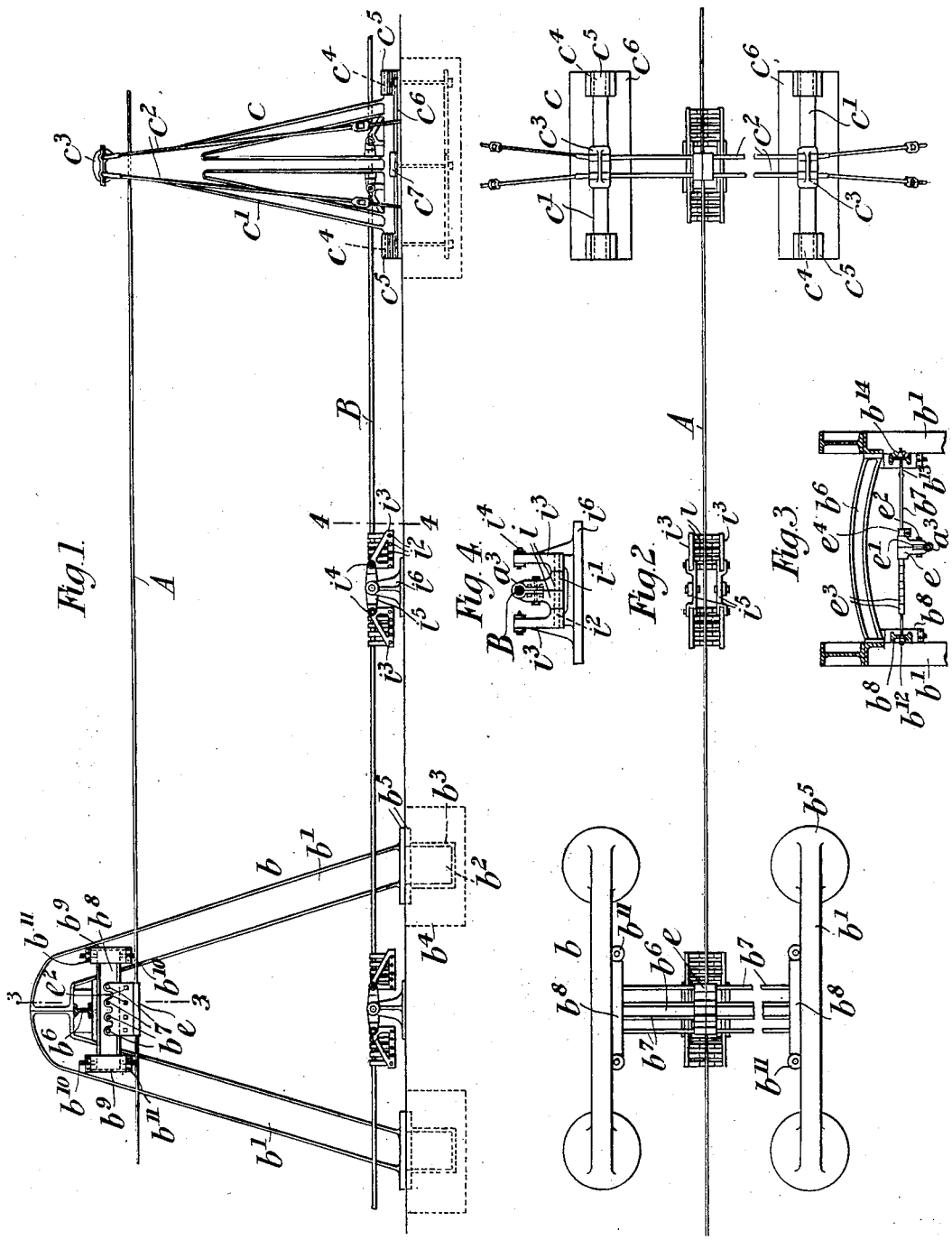
Witnesses.
Inventor.

No. 826,015. PATENTED JULY 17, 1906.
A. ST. V. BURNABY.
ELECTRICALLY PROPELLED VEHICLE AND PERMANENT WAY THEREFOR.
APPLICATION FILED OCT. 16, 1905.
4 SHEETS—SHEET 2.
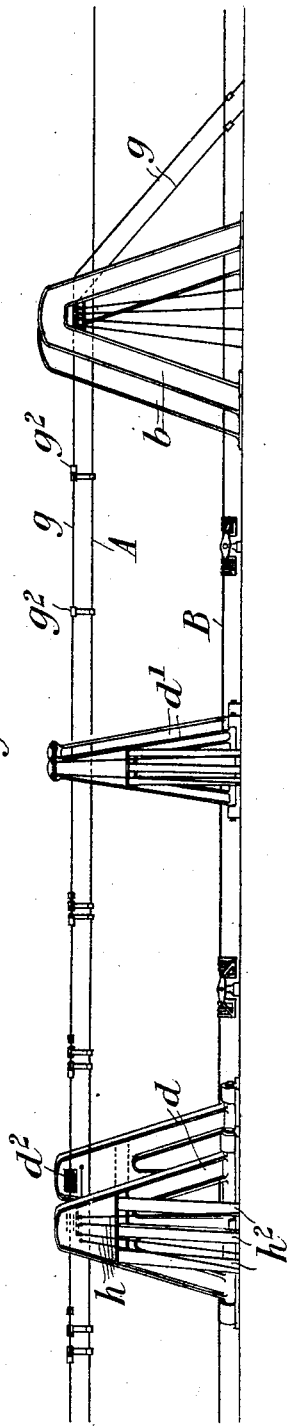
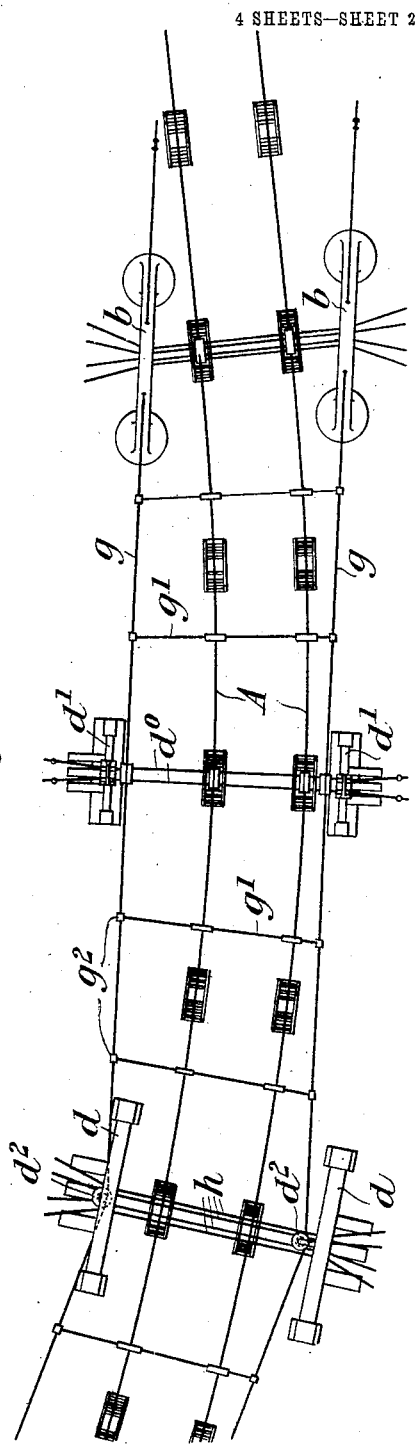

No. 826,015. PATENTED JULY 17, 1906.
A. ST. V. BURNABY.
ELECTRICALLY PROPELLED VEHICLE AND PERMANENT WAY THEREFOR.
APPLICATION FILED OCT. 16, 1905.

4 SHEETS—SHEET 3

Witnesses.            Inventor.

No. 826,015. PATENTED JULY 17, 1906.
A. ST. V. BURNABY.
ELECTRICALLY PROPELLED VEHICLE AND PERMANENT WAY THEREFOR.
APPLICATION FILED OCT. 16, 1905.
4 SHEETS—SHEET 4.
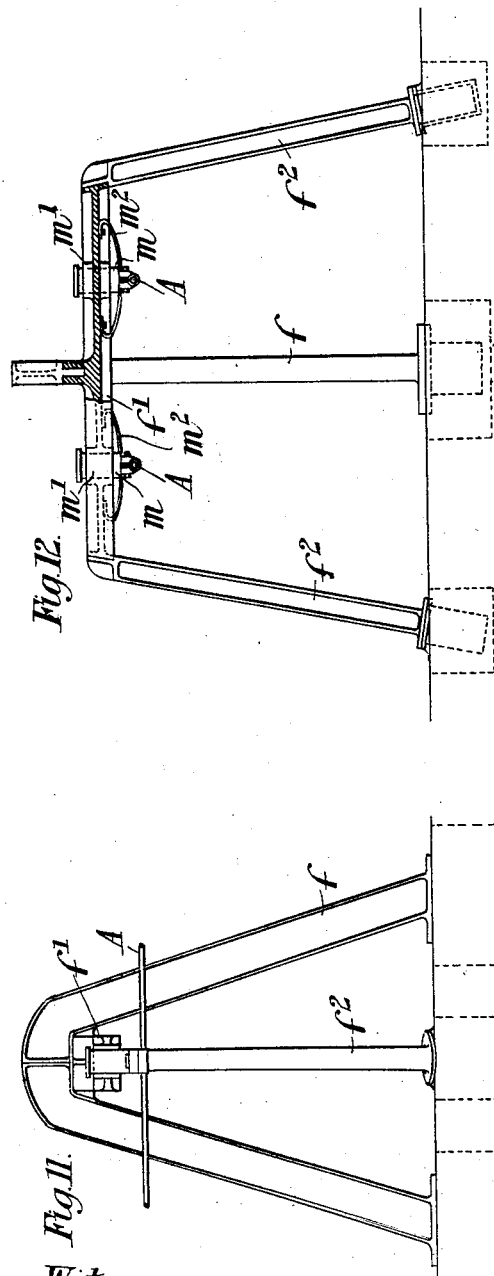
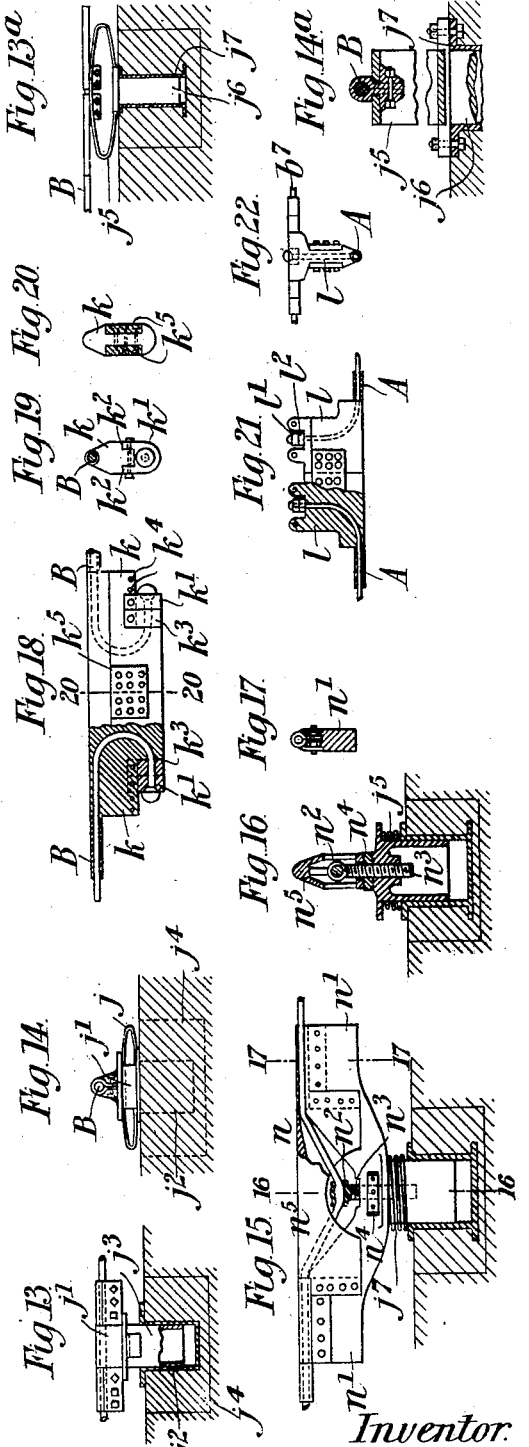
Witnesses. Inventor.

UNITED STATES PATENT OFFICE.

ARTHUR ST. VINCENT BURNABY, OF BRIGHTON, ENGLAND.

ELECTRICALLY-PROPELLED VEHICLE AND PERMANENT WAY THEREFOR.

No. 826,015.  Specification of Letters Patent.  Patented July 17, 1906.

Application filed October 16, 1905. Serial No. 282,990.

*To all whom it may concern:*

Be it known that I, ARTHUR ST. VINCENT BURNABY, a subject of the King of Great Britain, residing at 67 The Drive, Hove, Brighton, Sussex, England, have invented new and useful Improvements in Electrically-Propelled Vehicles and Permanent Ways Therefor, of which the following is a specification.

This invention relates to improvements in electrically-propelled vehicles and permanent way of the kind described in the specification of British Patent granted to me, No. 15,216 of July 25, 1901, in which an upper and lower rail are employed with the vehicles supported and guided between them by means of wheels.

According to my present invention I form the upper or both the upper and lower rails of the permanent way flexible instead of rigid as described in the said former specification, and I arrange the wheels at the upper parts of the vehicles to revolve in a vertical plane and provide them with grooves to engage the upper rail.

To enable my invention to be fully understood, I will describe it by reference to the accompanying drawings, in which—

Figure 23:
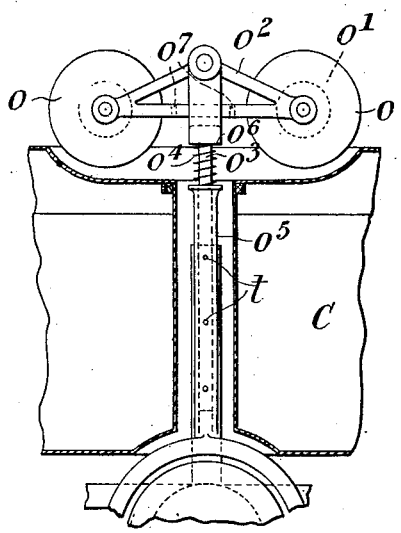
Figure 24:
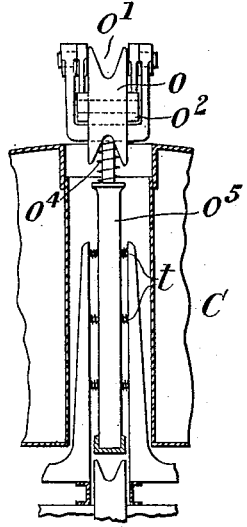
Figure 29:
Figure 7:
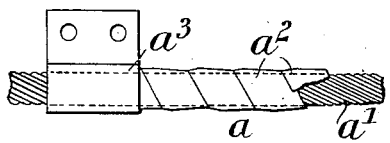
Figure 8:
Figures 25, 26:
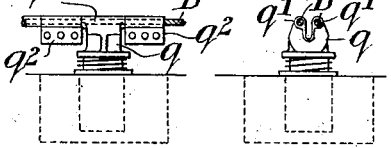
Figure 9:
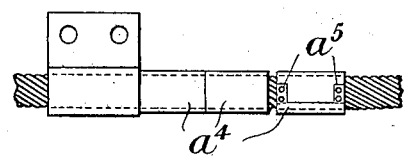
Figure 10:
Figure 27:
Figure 28:

Figure 1 is a sectional side elevation showing the upper and lower rails of my improved permanent way or railway and the means for supporting the same. Fig. 2 is a plan thereof. Figs. 3 and 4 are respectively sections on the lines 3 3 and 4 4 of Fig. 1, the latter section being enlarged. Figs. 5 and 6 are an elevation and a plan, respectively, illustrating the construction of the railway at a curve. Figs. 7 and 8 are a side view and a sectional end view of the flexible rail, and Figs. 9 and 10 are similar views illustrating a modification thereof. Figs. 11 and 12 are respectively a sectional side elevation and a sectional end elevation of a modified form of support for the upper rail or rails. Figs. 13 and 14 are a sectional side view and an end view of a support for the lower rail or rails. Fig. 13$^a$ is a similar view to Fig. 13, illustrating a modification; and Fig. 14$^a$ is a transverse section of the same enlarged. Fig. 15 is a sectional side view of a block wherein two adjacent ends of lower rail-sections are connected together by splicing and which also serves as a support to the said lower rail. Figs. 16 and 17 are sections, respectively, on the lines 16 16 and 17 17, Fig. 15. Figs. 18 and 19 are similar views to Figs. 13 and 14, showing a block joining the ends of two sections of the lower rail. Fig. 20 is a section on the line 20 20, Fig. 18. Figs. 21 and 22 are respectively a sectional side view and an end view of a block for joining the ends of two sections of the upper rail and also for supporting the said upper rail. Figs. 23 and 24 are respectively a sectional side view and a sectional end view illustrating the upper wheels or trolley device of the vehicles for use on my improved railway. Figs. 25 and 26 are a side view and an end view respectively, of a support for the lower rail, in which the latter is formed duplex. Figs. 27 and 28 are a side view and an end view of a device for maintaining the said rails at a fixed distance apart. Fig. 29 is a section of a portion of one of the lower wheels of a vehicle designed to engage with the said duplex rail.

In carrying out my invention I form the rails of metallic cables $a$, as shown clearly in Figs. 7 and 8, the said cables being made of stranded wires $a'$ and covered with a helical metal wrapping $a^2$, the edges of which overlap and are preferably chamfered, the said wrapping being formed in sections and terminating with or being connected to split tubes $a^3$, which serve for attachment to supports for the cables, as hereinafter described. Instead of the helical wrapping I can cover the cables with short lengths of tubing $a^4$, as shown in Figs. 9 and 10, which tubing for convenience can be formed in halves, as indicated, and the edges of which overlap, as at $a^5$, and are secured together by screws or the like, so that the said tubing can be removed or placed upon the cable with facility. By these constructions I produce upper and lower rails, which, while protected against wear and tear due to the traveling of the vehicle-wheels upon them, are at the same time perfectly flexible, the said rails being practically identical in construction, the lower rail being, however, of greater diameter than the upper rail.

The upper cable-rail A of each track I arrange to be supported upon three different forms of standards—namely, a main standard $b$, a secondary standard $c$, and a special standard $d$ for curves of the track. One form of main standard is illustrated in Fig. 1 and comprises two side frames, each of which is formed with legs $b'$ $b'$, having their bases $b^2$ fitted into sockets $b^3$, embedded in concrete $b^4$, flanges $b^5$ being formed on the said bases and sockets whereby they can be bolted together. The said frames are arranged on each side of the track and connected by a cross-girder $b^6$, beneath which are arranged cross-cables $b^7$ for the support of the upper rail, the said cross-cables thus constituting a spring-support for the said upper rail. The cross-cables $b^7$ are fixed to the upper portions of the frames $b'$ through the medium of horizontal beams $b^8$, the ends of which are carried in vertical guides $b^9$ and can be adjusted therein by screws $b^{10}$ on the said ends which engage with nuts $b^{11}$, this arrangement serving for adjusting the upper rail vertically. The cross-cables $b^7$ are connected to the beams $b^8$, preferably by means of heads or buttons $b^{12}$ at one end and by bolts $b^{13}$ and nuts $b^{14}$ at the other end. The upper rail A is supported by the cross-cables through the medium of a holder $e$, having a slot $e'$, into which the flanges of the split tube $a^3$, carrying the cable-rail and hereinbefore referred to, is placed and secured therein by bolts $e^2$, the flanges of the said split tube being previously secured together by bolts or the like, the heads of which engage with slots in the holder. The cross-cables $b^7$ are arranged to pass through holes in the holder $e$ and are maintained in position on the said cables, preferably by short lengths of tube $e^3$, Fig. 3, upon the cables between the holder and the beams $b^8$. Instead of these tubes $e^3$ split collars $e^4$ can be employed, clamped upon the cables on each side of the holder $e$.

Instead of the form of main standard shown in Figs. 1, 2, and 3 I can employ that shown in Figs. 11 and 12, in which a frame $f$, similar to the frame $b'$ in Figs. 1, 2, and 3, is arranged between the two tracks of the permanent way and supports a transverse horizontal girder $f'$, carried at the sides of the track by side upright girders $f^2$. The secondary standards $c$ each comprise two frames $c'$, arranged at the sides of the track and connected by cross-cables $c^2$ for the support of the upper flexible rail A. These cross-cables pass through the frames $c'$ and are carried down to the ground and anchored thereto in any suitable manner. $c^3$ indicates caps which clamp the cross-cables $c^2$ to the frames $c'$. Instead of the cables being carried down to the ground they may terminate at the frames $c'$ and be secured in a similar manner to the cross-cables described in connection with the main standard, stay-rods being employed to connect the said frames $c'$ to the ground.

In order that tension can be put upon the cross-cables $c^2$, I arrange the frames $c'$ so that they are pivoted at their bases, and for this purpose I provide them with cylindrical extensions $c^4$, carried in bearings $c^5$ in base-plates $c^6$. A half-bearing $c^7$ is also arranged on each base to support the frames $c'$ at the center. By this arrangement it will be seen that tension can be placed upon the cables $c^2$ through the medium of portions of the said cables which are anchored to the ground or by the rods used in lieu thereof, the frames $c'$ being caused to turn upon their pivots.

The secondary standards serve to take the weight of the upper flexible rails A between the main standards and prevent sag and sway of the said rails, and in practice the upper portions of the standards would be located farther from each other than their bases, so that they are slightly out of the perpendicular.

In order to obviate the necessity for numerous standards at curves, two cables $g\ g$ are arranged along the sides of the track carrying cross-cables $g'$ for the support of the upper flexible rails A, as shown clearly in Figs. 5 and 6. In this construction two of the special standards $d$ carry each a side cable $g$, in conjunction with two especial massive main standards $b$, the main standards being situated at the approach and end of the curve, while the special standards $d$ are located in pairs in the center of the bend of the curve and on opposite sides of the track. Between the standards $b$ and $d$ are arranged standards $d'$, similar in construction to the standards $c$. Other forms of curves than that shown would, of course, necessitate different grouping of the main and special standards. The side cables $g$ are anchored in the ground at the ends of the curve, pass through the standards $b$, are connected to cross-cables $d^0$ of the standards $d'$, and pass around pulleys $d^2$ on the standards $d$. The frames of the standards $d$ are somewhat similar in shape to those of the frames $b$, and their bases are pivoted in a similar manner to those of the secondary standards $c$ and are connected together by cross-cables $h$, clamped in the said standards and anchored to the ground. Side stay-girders $h^2$ are also employed for maintaining the standards rigidly in position. The cross-cables $g'$ are attached to the side cables $g$ by collars $g^2$, preferably split and flanged in order to grip the said cables $g$ and are connected to the said collars in any suitable manner. For instance, they may be formed with eyes engaging eyes on the collars $g^2$ on one side of the track and with swivel-bolts at the other end and nuts, the said bolts passing through eyes on the collars $g^2$ on the other side of the track. The side cables may be provided with short lengths of tube as a protection and also as a means for maintaining the collars $g^2$ in their proper relative positions.

The upper rail A at curves I arrange out of the vertical central plane of the vehicles, so that the latter are caused to assume an angle in the usual way when passed around the curves. The split tube $a^3$ of the lower carrying-rail B is gripped between supporting-plates $i$, Fig. 4, bolted together and firmly securing the tube $a^3$. The plates $i$ are provided with transverse holes $i'$ at their lower ends by which they are supported upon rods $i^2$ of side frames $i^3$, a series of pairs of plates $i$ being supported between a pair of such side frames $i^3$, two pairs of which are pivoted at $i^4$ to the ends of the levers or links $i^5$, fulcrumed in brackets $i^6$, supported and anchored to the ground in any suitable manner. The described construction I term a "cushioned link," and it serves to utilize the spring or elasticity of the cable to prevent shocks to the vehicles at the point of support for the cable. This device can also be employed to carry the upper flexible rail when standards of the kind not requiring cross-cables and shown in Figs. 11 and 12 are employed.

Instead of the cushioned-link device I may employ independent springs in connection with the supports for the cable of the lower rail. One form of this arrangement is shown in Figs. 13 and 14, in which a semi-elliptic spring $j$ is employed. This spring passes through a slot in the holder $j'$ and is bolted down upon the flanges of a foundation-socket $j^2$, the holder $j'$ being provided with a downward extension or pillar $j^3$, which slides and is guided in the said socket $j^2$, the said socket being embedded in concrete or the like $j^4$. In this arrangement the upper portion of the holder is shown as arranged to carry the cable-rail in a similar manner to the holder $e$, hereinbefore described, but inverted.

In addition to the spring-supports described for the lower cable-rails I may employ auxiliary spring-supports, as shown in Figs. 13$^a$ and 14$^a$, in which elliptical springs $j^5$ are connected at their upper parts to the protective tubing of the cables, while their lower parts are attached to pillars $j^6$, sliding in a foundation-socket $j^7$. By using these auxiliary supports in conjunction with the main supports the cable-rails need not be of such large dimensions as if the main supports were used alone.

Instead of the arrangements shown in Figs. 13 to 14$^a$ I may employ that shown in Figs. 15 and 16, in which a helical spring $j^8$ is arranged between the holder and the foundation-socket. For joining the cable-sections the cable ends when used for the lower rail pass through grooves in blocks $k$, Figs. 18 to 20, the said ends being provided with a head or button located in movable sockets $k'$, which are provided with flanges $k^2$, bolted to the blocks. Between the central portions of the blocks $k$ and the sockets $k'$ are arranged vertical thrust-blocks $k^3$, through which the cable ends pass to take the thrust of the sockets $k'$. By this arrangement the sockets $k'$ are rendered adjustable, a series of holes $k^4$ being provided in the blocks $k$, so that the said sockets can be fixed at different distances upon the said blocks to allow of adjustment of the cables, the space between the sockets and central portions of the blocks $k$ being filled by blocks $k^3$ of different dimensions. The blocks $k$ are connected together by plates $k^5$, and the upper surfaces of the said blocks $k$ are rounded in order to form a continuation surface between the ends of the cable-sections.

Figs. 21 and 22 show blocks $l$ for the junction of the two adjacent ends of cable-sections for the upper rail, which blocks are similar in construction to the blocks $k$, except that the cable ends instead of being bent round and carried back in the direction of the cable, as shown in Fig. 18, are turned upwardly and issue through the tops of the blocks and are secured by sockets $l'$ and adjusting-blocks $l^2$, similar to the blocks $k'$ and $k^3$. Where cross-cables are not employed for the support of the upper rail A, as in Figs. 7 and 8, the split tubes $a^3$ of the cable are supported in holders $m$, designed to slide in sockets $m'$, semi-elliptical springs $m^2$ being arranged on the said holders and having their ends attached to the under side of the cross-girder $f'$, whereby a spring connection is made between the cable and the said cross-girder. Instead of joining the cable ends to blocks, as above described, they may be spliced together, and for this purpose I advantageously employ the construction of holder shown in Figs. 15, 16, and 17. This holder $n$ is formed with two portions $n'$ $n'$, grooved to receive the cable, which is looped or curved downward between the said portions and passes through an eye $n^2$ at the upper end of a screw $n^3$, engaging with a nut $n^4$ in the body of the holder. By revolving the nut $n^4$ it will be seen that the screw can be drawn down, and thus tighten the cable. The eye $n^2$ is advantageously curved, as shown, to accommodate itself to the loop of the cable. The gap between the two portions $n'$ $n'$ of the holder is bridged by a plate $n^5$, bent round the holder and forming a traveling surface for the wheels of the vehicle between the two sections of the cable. The trolley on the vehicles C for engaging the upper rail I now form with its wheels $o$ vertical instead of horizontal, as shown in Figs. 23 and 24, and I provide them with deep grooves $o'$ to engage the said rail. The said wheels are arranged in pairs tandemwise and are carried by side frames $o^2$, pivoted to the spring-supported central pillar $o^3$, carried by the vehicle, the spring $o^4$ in the present instance being arranged between the top of the column $o^6$, in which the pillar $o^3$ slides, and a shoulder $o^6$ at the upper part of the said pillar. I also arrange the studs $t$ for cushioning the side thrust rigidly to the column $o^6$ instead of being attached to loose collars thereon. The side frames $o^2$ are connected together by cross-pieces $o^7$.

Although I have described the upper and lower rails as each consisting of a single cable, I may employ two or more such cables running side by side, the travelling wheels or the trolley-wheels of the vehicle being formed with two or more grooves to engage with the said cables. Figs. 25 and 26 show an arrangement of two of such lower cables carried by a spring-support $q$, having upward lugs or projections $q'$ $q'$, through which the cables pass and are supported. Fig. 29 shows a section of a traveling wheel designed to engage with the double traveling rail and being provided with a central flange $r$, which passes between the two cables. Figs. 27 and 28 show a connecting-piece $s$, a series of which are used for the two cables between the points of support for maintaining them at a fixed distance apart. The said connecting-pieces $s$ are formed with eyes $s'$ $s'$, through which the cables pass, the said eyes being exteriorly of the same size as the sheathings of the cables, so as to present a uniform surface.

In the arrangement shown in Fig. 25, the cables run through eyes in the lugs $q'$ and are conveniently secured to the holder by split tubes $q^2$, arranged on each side of the said holder and clamped upon the cable.

Having now particularly described and ascertained the nature of my said invention and in what manner the same is to be performed, I declare that what I claim is—

1. In a single-rail high-speed railways, the combination of an upper guide-rail with a lower spring-supported carrying-rail, substantially as described.

2. In single-rail high-speed railways, the combination of an upper guide-rail with a lower spring-supported carrying-rail, said carrying-rail being flexible and under tension, substantially as described.

3. A railway comprising upper and lower rails for respectively guiding and supporting the vehicles, one of said rails being flexible, and attachments and spring-supports for both the rails, substantially as described.

4. A railway comprising upper and lower rails for respectively guiding and supporting the vehicles, one of said rails being flexible, and means whereby the elasticity of the lower rails is utilized to form a yielding or spring support for the same, substantially as described.

5. In a railway comprising upper and lower rails for respectively guiding and supporting the vehicles, said rails being flexible, means for maintaining each rail or both flexible rails in a state of tension to obtain a yielding and springy permanent way, substantially as described.

6. A railway comprising upper and lower rails for respectively guiding and supporting the vehicles, one of said rails being flexible and standards carrying cross-cables for the support of the upper rail, substantially as described.

7. A railway comprising upper and lower rails for respectively guiding and supporting the vehicles, one of said rails being flexible, standards on each side of the track carrying side cables, and cross-cables connected to the side cables and carrying the upper rail, substantially as described.

8. The combination with a railway comprising upper and lower rails for respectively guiding and supporting the vehicles, one of said rails being flexible, of vehicles the upper wheels of which are arranged in pairs tandem-wise, each pair being carried on a frame pivoted at a point between the said wheels and spring-supported on the vehicle, substantially as described.

9. A rail comprising a series of cable-sections enlarged at their ends, blocks provided with grooves, and sockets adjustably secured to the blocks whereby the said cable-sections may be connected together, substantially as described.

10. A rail comprising a series of cable-sections enlarged at their ends, blocks provided with sockets adjustably secured thereto, and adjusting-blocks whereby the cable-sections may be secured together and maintained at a desired tension, substantially as described.

11. A railway comprising upper and lower rails for respectively guiding and supporting vehicles, one of said rails being flexible and standards pivotally mounted carrying cross-cables for the support of the upper rail, substantially as described.

12. A railway comprising upper and lower rails for respectively guiding and supporting the vehicles, one of said rails being flexible, and standards pivotally mounted carrying cross-cables for the support of the upper rail, said standards being normally out of perpendicular, whereby tension is applied to the cables, substantially as described.

13. A railway comprising upper and lower rails for respectively guiding and supporting vehicles, one of said rails being flexible, standards, cross-cables provided with a tension device adjustably secured to said standards, a rail-support mounted on said cross-cables, and means for maintaining said support and rail at a desired point on said cross-cable, substantially as described.

14. A rail-support consisting of the combination with a bracket rigidly secured at its base, of a link fulcrumed in said bracket, side frames pivoted to the ends of said link provided with rods, supporting-plates having transverse openings to receive said rods and a split tube for carrying the rail, said tube having projections adapted to be gripped between the supporting-plates and means for rigidly fastening the supporting-plates together, substantially as described.

ARTHUR ST. VINCENT BURNABY.

Witnesses:
W. J. SULIS,
WM. TIERN.